Figure 1:
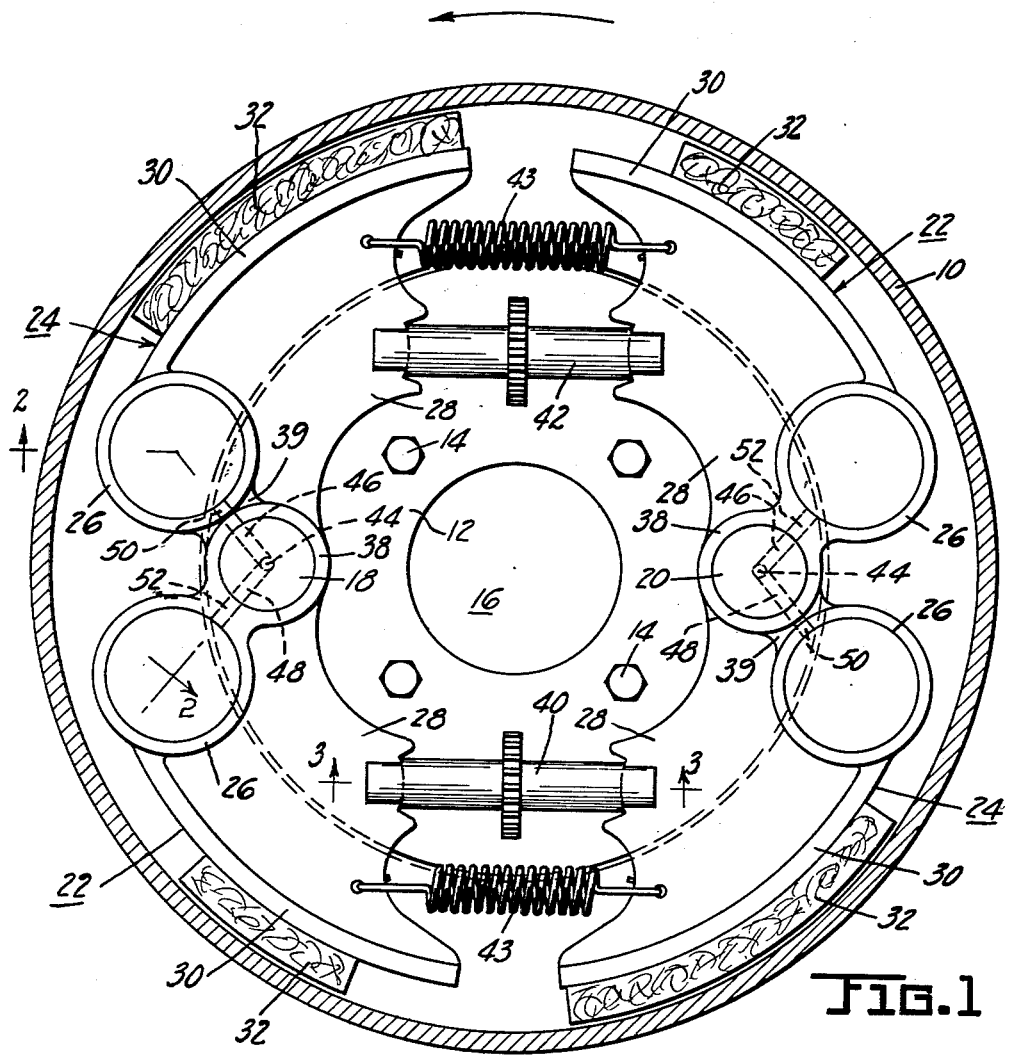

June 28, 1960 R. T. BURNETT 2,942,694
BRAKE
Filed June 22, 1955 2 Sheets-Sheet 1

INVENTOR.
RICHARD T. BURNETT
BY Cecil J Arens
ATTORNEY

June 28, 1960 R. T. BURNETT 2,942,694
BRAKE
Filed June 22, 1955 2 Sheets-Sheet 2
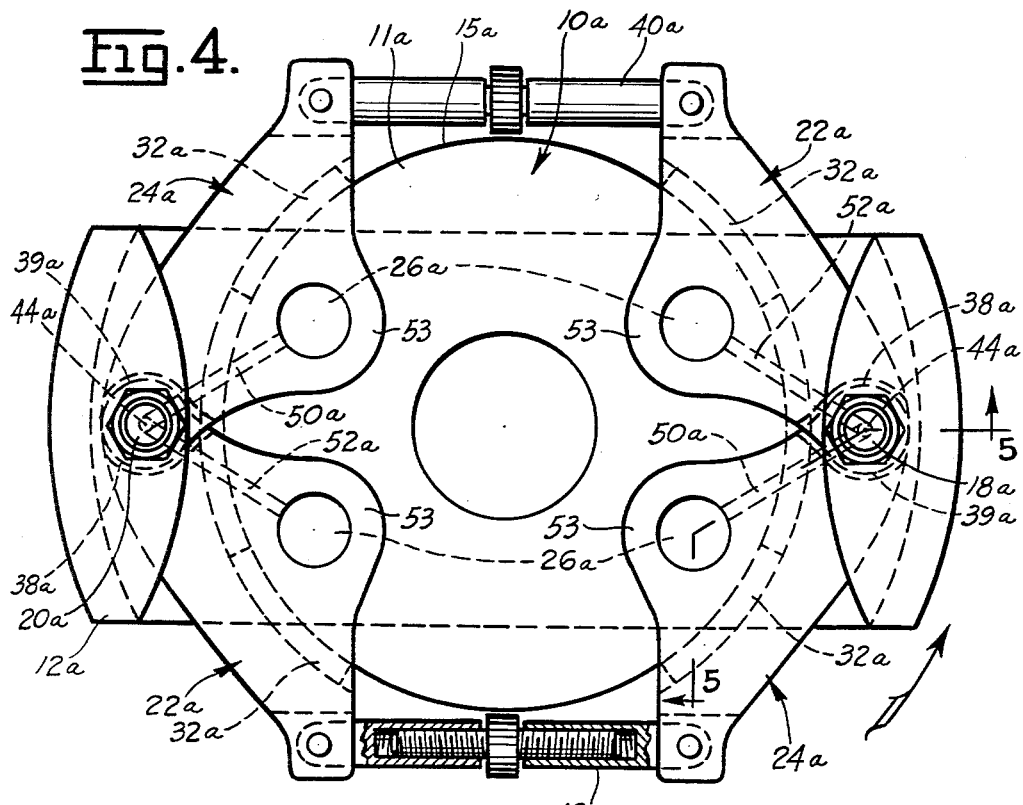
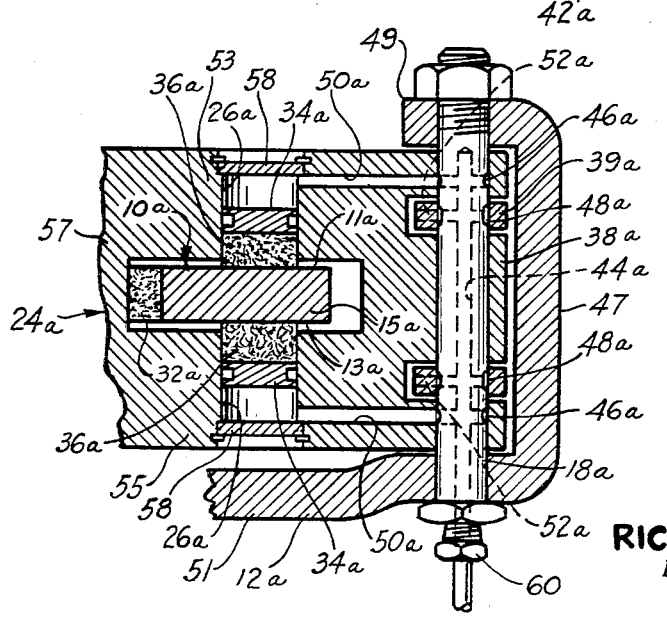
INVENTOR.
RICHARD T. BURNETT.
BY John A. Young
ATTORNEY.

United States Patent Office 2,942,694
Patented June 28, 1960

2,942,694
BRAKE

Richard T. Burnett, South Bend, Ind., assignor to Bendix Aviation Corporation, South Bend, Ind., a corporation of Delaware Filed June 22, 1955, Ser. No. 517,181

12 Claims. (Cl. 188—70)

This invention relates to a brake having either or both of the following attributes: engagement of one friction means is brought about as the result of engagement of another friction means and/or a plurality of rotor surfaces are engaged by friction means associated with a single stator unit.

This disclosure constitutes a continuation-in-part of my copending application No. 421,764, filed Apr. 8, 1954, and now abandoned, which is herewith intended for supersedence by this application.

An important object of this invention is to combine the desirable operating characteristics of both disk and drum (or shoe) brakes in a single unit.

It is a further object of the invention to obtain, performancewise, the desirable features of the brake illustrated in my copending application No. 369,197, filed July 20, 1953, now Patent No. 2,871,990, while at the same time increasing the effectiveness thereof by novel arrangement of the individual units in the brake assembly.

The above and other objects and features of the present invention will appear more fully hereinafter from a consideration of the following description, taken in connection with the accompanying drawings, wherein embodiments of the invention are illustrated by way of example.

Figures 2, 3:
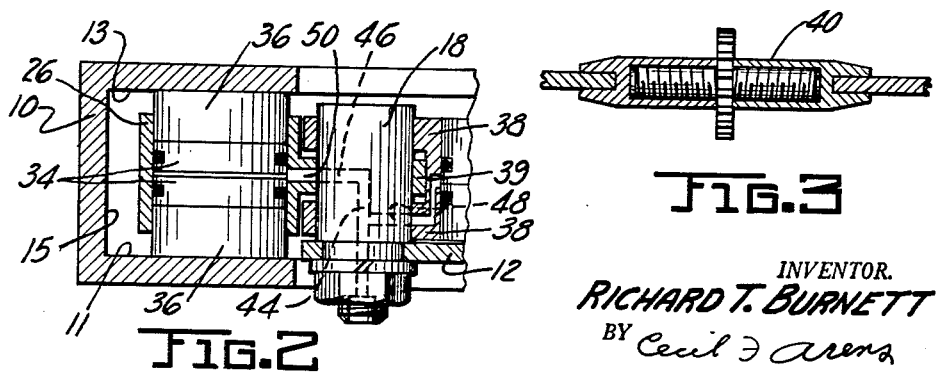

In the drawings:

Figure 1 is a plan view of a brake assembly embodying my invention, a portion of the rotor being removed;

Figures 2 and 3 are section views taken on the lines 2—2 and 3—3, respectively, of Figure 1;

Figure 4 is a plan view of a brake constituting a further embodiment of the invention; and Figure 5 is a section view taken on line 5—5 of Figure 4.

A U-shaped cross section rotor 10 similar to the one disclosed in my copending application No. 324,167, filed December 5, 1952, and abandoned July 25, 1956, in favor of continuation application Serial No. 598,698, filed July 18, 1956, is used with the embodiment shown in Figures 1 to 5. The rotor 10 does not form a part of the present invention, but for background purposes it may be stated that the rotor broadly consists of two spaced disk elements 11 and 13 joined by a substantially cylindrical drum element 15. The rotor 10 is suitably secured to a rotatable part of the vehicle such as a hub or the like (not shown).

The brake assembly shown in Figure 1 includes a torque-taking member 12 which is secured by a plurality of fastening member 14 to a nonrotatable part of the vehicle, such as axle flange 16.

Two oppositely located anchoring devices 18 and 20 are fastened to the nonrotatable torque-taking member 12.

Pivotally mounted on each anchoring device are two brake units designated generally by reference numerals 22 and 24. Each of the friction units 22 and 24 includes a cylinder 26 transversely received in web 28, and a rim 30 having friction material lining 32. The friction material lined rim 30, forms a "shoe" portion of the unit and will hereinafter be referred to as such.

Reciprocably received in each cylinder 26 are two oppositely-acting pistons 34 having friction material facing 36 engageable with the spaced disk elements 11 and 13 of rotor 10.

The mounting portions 38 and 39 of units 22 and 24 are interfitted (as illustrated in Figure 2) to permit independent pivotal movement of the units 22 and 24 on each anchoring device.

Two adjustable struts 40 and 42 interconnect adjacent ends of brake units 22 and 24 which are associated with different anchoring devices 18 and 20. A pair of springs 43 retains the shoe ends in engagement with adjustors 40 and 42.

The anchoring devices in the present invention may be adapted to form a part of the hydraulic system. Each anchoring device has a centrally-located longitudinal bore 44 intersecting radial bores 46 and 48. The radial bores 46 and 48 are communicated with cylinders 26 via conduits 50 and 52, respectively.

When the brake is applied, fluid pressure from a master cylinder source (not shown) is introduced through the anchoring devices to each of the cylinders 26 in the four brake units, causing spreading of the pistons 34 reciprocably mounted therein. The friction material facing 36 is brought into forcible engagement with the two spaced disk elements 11 and 13 of the rotor. Assuming counterclockwise rotation of the rotor, engagement of the friction material facing 36 on each of the pairs of pistons 34 with disk elements 11 and 13 produces counterclockwise actuation of each of the four units about anchoring devices 18 and 20. Counterclockwise actuation of units 24 applies the shoe portions thereof radially outward against the cylindrical drum element 15 of the rotor. Counterclockwise movement of units 22 rotates the shoe portions thereof away from an applied position. Counterclockwise movement of units 22 about anchoring devices 18 and 20 transmits supplementary applying force on the shoe portions of units 24 through the struts 40 and 42.

Braking with counterclockwise direction of rotor rotation is accomplished by utilizing the two shoe portions of units 24 and the four pairs of pistons 34 received in each of the four units; the reaction from application of the four pairs of pistons is utilized as an applying effort on the shoe portions of units 24.

Assume now opposite direction of vehicle motion with clockwise direction of rotor movement. Operator generated fluid pressure is introduced via anchoring devices 18 and 20 to each of the cylinders 26 in the four units, causing the pairs of pistons therein to be spread apart, forcibly engaging the facing 36 with the two spaced disk elements of the rotor.

The reaction from engagement of the facing 36 with the disk elements causes clockwise actuation of each of the four units about anchoring devices 18 and 20, respectively. Clockwise actuation of units 22 radially outwardly applies the shoe portions thereof against the drum element 15 of the rotor. Clockwise actuation of units 24 about anchors 18 and 20 produces radially inward actuation of the shoe portions thereof tending to rotate them away from an applied position. It will be noted, however, that clockwise pivotal movement of units 24 on anchors 18 and 20 exerts applying effort on the shoe portions of units 22 through adjustable struts 40 and 42. The braking effort in this direction of rotation consists of that exerted by the shoe portions of units 22 and the four pairs of pistons 34; the applying effort exerted on the shoe portions is made up of the torque reaction from application of the facing 36 on all four pairs of pistons 34.

The brake is substantially equally effective in either direction of vehicle motion; the adjustable struts 40 and 42 transmit shoe-applying torque reaction from one unit to the other, irrespective of the direction of motion to be impeded.

It will be noted that the units 22 and 24 are independently movable on anchors 18 and 20. The purpose of this is to permit individual adjustment of each shoe portion of the units by the adjustable struts 40 and 42.

The lining 32 on the shoe portions of units 24 may be relatively larger than that provided on units 22. The shoe portion of units 24 is applied during forward motion of the vehicle and since the speeds are relatively greater and there is higher frequency in the number of stops than in reverse applications, the greater amount of lining is provided to approximate the wearlife of the lining on the shoe portions of units 22, which are applied only during reverse direction of vehicle motion.

In the embodiment shown in Figures 4 and 5, parts corresponding to those previously described, will be referred to with the same reference numeral having a subscript "a" affixed thereto.

Rotor 10a is suitably secured to a rotatable part of the vehicle such as a hub (not shown) in any well known manner. The rotor consists of a disk having oppositely facing sides 11a and 13a joined by a substantially cylindrical surface 15a.

The torque taking member 12a is secured to a fixed part of the vehicle in any suitable manner. The torque taking member has a lateral extending flange 47, the end of which is turned back to form side 49. The base 51 of the torque taking member is a stationary part of the vehicle. Anchoring devices 18a and 20a are passed through the spaced apart sides 49 and 51 of the torque taking member 12a (Figure 5).

Pivotally mounted on each anchoring device are two brake units designated generally by reference numerals 22a and 24a. Each of the friction units 22a and 24a include sides 53 and 55, having cylinder bores 26a formed therein. A transverse side 57 joins sides 53 and 55. It will be noted in Figure 4 that sides 53 and 55 overlie sides 11a and 13a, respectively, of the rotor. At the base of transverse side 57 there is secured an arcuate friction material lining segment 32a which, in conjunction with side 57, forms a "shoe" portion of the unit and will hereinafter be referred to as such.

Reciprocably received in each cylinder bore 26a is a piston 34a having friction material facing 36a. Removable plugs 58 are utilized to seal off remote ends of the cylinder bores to form fluid tight chambers behind pistons 34a.

The mounting portions 38a and 39a of the respective units are interfitted as shown in Figure 5 to permit independent pivotal movement of the units on each anchoring device.

Two adjustable struts 40a and 42a interconnect adjacent ends of brake units 22a and 24a which are associated with spaced anchoring devices 18a and 20a.

The anchoring devices form a part of the hydraulic system through which fluid is communicated to the pistons 34a. The anchoring device has a centrally located longitudinal bore 44a which intersects radial bores 46a at the extreme ends of the anchoring device and a second pair of radial bores 48a. Radial bores 48a terminate in annular channels leading to the fluid chambers in the spaced sides of unit 22a via conduits 52a. Radial bores 46a are connected with conduits 50a leading to cylinder bores 26a in the spaced sides of units 24a. A fluid pressure inlet is located at the extreme end 60 of each anchoring device. The fluid introduced at this point is distributed to the fluid motors formed in the sides of the unit through the passages in the anchoring device and conduits formed in the sides 53 and 55.

When the brake is applied, fluid pressure, from a master cylinder source, is introduced to each of the cylinders 26a in the four brake units causing the pistons 34a to move toward the rotor. The friction material facing 36a on the pistons 34a is brought into forcible engagement with surfaces 11a and 13a of the rotor. Assuming counterclockwise rotation of the rotor (Figure 4) engagement of the friction material facing 36a on each of the pistons 34a with the opposite sides of the rotor produces a clockwise rotation of each of the four units about the associated anchoring device 18a or 20a. Clockwise actuation of units 24a applies the "shoe" portions thereof, bringing lining 32a radially inward to engage the cylindrical drum surface 15a of the rotor. Clockwise movement of units 22a rotates the "shoe" portions thereof away from surface 15a of the rotor. Clockwise movement units 22a transmits supplementary force to units 24a through struts 40a and 42a to assist in applying the shoe portions of units 24a.

Braking with counterclockwise direction of rotor rotation is accomplished through application of the two "shoe" portions of units 24a and the four pairs of pistons in each of the four units. The reaction from application of the four pairs of pistons is utilized as applying effort for the shoe portions of units 24a.

In the opposite direction of vehicle movement, with clockwise rotor movement, the shoe portions of units 22a are applied. When the pairs of pistons in each of the units engage the opposite sides of the rotor during clockwise rotation thereof, the respective units turn counterclockwise on anchors 18a and 20a. When units 24a turn counterclockwise, the "shoe" portions thereof move away from engagement with surface 15a of the rotor and exert supplementary applying effort on the shoe portions of units 22a through the struts 40a and 42a. The "shoe" portions of units 22a are further applied by the reaction developed from application of the pistons which are mounted therein. The braking effort in this direction of rotation of the rotor consists of that developed by the "shoe" portions of units 22a and the four pairs of pistons 34a; the applying effort exerted on the shoe portions is made up of the torque reaction from application of the facing 36a on all four pairs of pistons 34a.

The "shoe" portions of the units are held in a normally retracted position by a coil spring (not shown) which is fastened between the shoe portion and a fixed part of the brake. Retractile movement of the shoe is limited by a spring loaded stop (not shown). These return springs are provided for only two of the units, since the interconnected units are subject to the spring loading and thus all four units are provided with return spring means, two of them directly, and the other two indirectly.

Just as in the previous embodiment, the brake is substantially equally effective in either direction of vehicle motion; the adjustable struts transmit shoe applying torque reaction from one unit to the other, irrespective of the direction of motion to be impeded. Since the shoes are independently mounted on the associated anchoring devices, it is possible to adjust each of the units individually so that the shoe portions thereof may be located at the desired retracted position.

On the whole, the embodiment shown in Figures 4 and 5 differs from that illustrated in Figures 1 to 3 in that the units are mounted exteriorly of the rotor with the direction of application of the "shoe" elements being toward the center of the rotor rather than outwardly therefrom.

It is readily apparent that I have accomplished highly effective braking by utilizing four pairs of pistons for both impeding the rotor and developing torque reaction utilizable as an applying force on two "shoe" portions of the brake units. With the present invention it is possible to obtain torque values in the range of 250 thousand inch-pounds of torque per brake. This figure is highly significant when it is considered that heavy duty brakes providing 150 thousand inch-pounds of torque are acceptable for some usages.

From a consideration of the description of the device, it will be understood that I have attained all of the objectives of the invention.

Although only two selected embodiments of the invention have been described, it will be understood by those skilled in the art that the objects of this invention may be attained by the use of constructions different in certain respects from those disclosed without departing from the underlying principles of the invention.

I claim:

1. A brake comprising a U-shaped rotatable drum having three friction element engaging surfaces, a torque-taking member, a pair of oppositely located anchoring means fixedly secured to said torque-taking member, a plurality of friction units pivotally associated with each of said anchoring means and consisting of axially movable friction elements and a radially applied shoe portion, and a pair of adjustable force transmitting means interconnecting adjacent ends of the units associated with different anchoring means, each of said units being pivotally actuated by braking torque developed from engagement of said axially movable friction elements with spaced apart surfaces of said rotatable member, pivotal actuation of said units being utilizable for radially applying the shoe portion thereof or exerting supplementary applying effort through said force transmitting means on the shoe portion of the adjacent unit depending on the direction of motion of said rotatable member to be impeded.

2. A kinetic-energy-absorbing device comprising a torque-taking member, a rotor having oppositely facing sides joined by a cylindrical surface, anchoring means secured to said torque-taking member and located beyond said rotor, a plurality of friction units pivotally associated with each of said anchoring means and independently movable thereof, each of said friction units including axially applied first friction elements which are forced together to clamp said rotor therebetween, and a radially inwardly applied second friction element which is applied by pivotal actuation of said units produced by engagement of said disk elements with the oppositely facing sides of said rotor, and force transmitting means interconnecting units associated with different anchors so that supplemental applying effort on the shoe portions thereof is communicated between the units in each direction of rotation, and means for holding the radially applied friction elements in a normally retracted position.

3. A brake comprising a disk shaped rotor having three friction element engaging surfaces, a torque-taking member, a pair of oppositely located anchoring means fixedly secured to said torque-taking member, a plurality of friction units pivotally associated with each of said anchoring means and consisting of axially movable friction elements, arranged to clamp said rotor therebetween by engaging the oppositely facing sides thereof, a radially inwardly applied friction element, and a pair of adjustable force transmitting means interconnecting adjacent ends of the units associated with different anchoring means, each of said units being pivotally actuated by braking torque developed from engagement of said axially movable friction elements with the oppositely facing surfaces of said rotor, pivotal actuation of said units being utilizable for radially inwardly applying the shoe portion thereof or exerting supplementary applying effort through said force transmitting means on the shoe portion of the adjacent unit depending on the direction of motion of said rotatable member to be impeded.

4. A brake comprising a rotatable member having two spaced disk surfaces and a substantially cylindrical surface, a torque-taking member, a pair of anchoring devices fixedly secured radially beyond said rotor to said torque-taking member, and two pairs of brake units mounted exteriorly of said rotor, one pair of said units pivotally associated with each of said anchoring devices, each of said units being adapted for independent pivotal movement on a respective anchoring device and provided with axially movable friction elements arranged to develop torque reaction producing pivotal actuation thereof, a radially inwardly movable friction element provided on each of said units, and a force transmitting means interconnecting adjacent portions of said units associated with different anchoring devices, each of said units being pivotally actuated in one direction to radially inwardly apply the radially movable friction element against the substantially cylindrical periphery of said rotatable member and in opposite direction to supplement applying effort on the radially movable friction element of the unit operatively connected therewith.

5. A brake comprising a torque-taking member, a plurality of spaced apart anchoring devices fixedly secured to said torque-taking member, a plurality of brake units, at least two of said units being pivotally associated with one of said anchoring devices and independently movable thereon, and means interconnecting adjacent ends of said units associated with spaced apart anchoring devices, each of said units including an axially movable first friction element and a radially applied second friction element located radially intermediate said anchor and axially movable first friction element, said axially applied first friction element being adapted to produce pivotal actuation of said unit thereby radially applying the second friction element thereof or cooperably applying the second friction element of the unit operatively connected therewith, depending upon the direction of motion to be impeded.

6. A brake comprising a rotatable U-shaped cross section member, a torque taking member, two oppositely located anchoring means secured to said torque taking member, two pairs of composite disk and shoe brake units, means for mounting one pair of each of said units on each of said anchoring means and providing independent pivotal movement of each unit thereon, a pair of oppositely located adjustable struts interconnecting adjacent shoe portions of units mounted at different anchoring means to provide transmittal of braking force therebetween as applying effort, resilient means yieldably retaining said shoe portions in engagement with said struts, each of said brake units being pivoted to bring its shoe portion into engagement with said rotatable member, each of said units being individually pivoted on its mounting and each interconnected by said strut with a unit mounted at a different anchoring means whereby the pivotal movement of a brake unit in a direction to apply its shoe portion is effected by its coacting disks and the disks of the unit connected therewith.

7. A brake comprising a rotatable member having three friction element engaging surfaces, a torque taking member, a plurality of circumferentially spaced apart anchors fixedly secured to said torque taking member, a plurality of composite disk and shoe brake units having interfitting portions for mounting said units on said anchors and providing independent pivotal movement of said units thereon, each said unit being pivoted by engagement of its disk members with said rotatable member to actuate its shoe member radially outwardly or radially inwardly depending upon the direction of rotation of said rotatable member, a plurality of struts interconnecting adjacent ends of said units associated with different anchors and oppositely movable by its disk members whereby radially outward application of the shoe of each of said interconnected units is effected by the braking action of the disk members of both of said interconnected units, and means for maintaining the shoes of said units in a normally retracted position.

8. A brake comprising a rotatable member having two spaced disk surfaces and a substantially cylindrical surface, a torque taking member, a pair of circumferentially spaced anchoring devices fixedly secured to said torque taking member and two pairs of brake units, means for mounting one pair of said brake units on each of said anchoring devices to provide independent pivotal movement of the respective units on its anchoring member, each of said units having axially movable friction elements engageable with said rotatable member to effect pivotal actuation thereof in a direction depending upon the rotational direction of said rotatable members, and a radially movable friction element movable radially inwardly or radially outwardly depending on the direction of rotation of said rotatable member, at least two of said units being pivoted to effect radially outward actuation of said radially movable friction elements in each direction of rotation to apply the radially movable friction element against said rotatable member, and force transmitting means interconnecting adjacent portions of said units associated with different anchoring devices which are pivotally movable in opposite directions to communicate the braking action of the axially movable friction elements of one of said units to the other of said units and supplementing the applying effort on its radially movable friction element effected by its coacting axially movable friction elements.

9. A brake comprising a rotor, a torque taking member, two circumferentially spaced anchoring means secured to said torque taking member, two pairs of composite disk and shoe brake units, means for mounting a pair of said units on each of said anchoring means to provide independent pivotal movement thereon by a respective one of said units, a pair of oppositely located adjustable struts interconnecting adjacent units associated with different anchoring means, said interconnected units being operatively pivotally movable on their respective anchoring means whereby the shoe portion of only one of said units is operative in braking in one or the other directions of said rotor rotation, and resilient means yieldably retracting said shoe portions, each of said units having braking torque transmitted through said strut in supplementing the applying effort on its shoe portion from the unit interconnected therewith.

10. A kinetic-energy-absorbing device comprising a rotor having three friction element engaging surfaces, a nonrotatable torque taking member, a plurality of circumferentially spaced anchoring devices fastened to said torque taking member, a plurality of friction units, means for mounting a pair of said units on each of said anchoring devices to provide independent pivotal movement thereon, said friction units and said three friction surface rotor being relatively rotatable, and force transmitting means interconnecting portions of said units at different anchoring devices and pivotally movable in opposite directions, said units each including first friction elements movable axially with respect to the axis of rotation of said rotor and a radially applied second friction element, the axially applied first friction element effecting pivotal actuation of said unit upon engagement thereof with the spaced apart surfaces of said rotor and thereby radially applying the second friction element of the unit or transmitting its braking force through said force transmitting means to the second friction element of the unit connected therewith.

11. A brake comprising a U-shaped rotatable drum having three friction element engaging surfaces, a torque taking member, a pair of oppositely located anchoring devices fixedly secured to said torque taking member, two pairs of friction units, each pair consisting of axially movable friction elements and a radially large shoe portion, means for mounting one pair of said devices on a respective anchoring device and providing independent pivotal movement thereon, and a pair of adjustable force transmitting struts interconnecting adjacent ends of the units associated with different anchoring devices, said interconnected units being movable pivotally in opposite directions to apply one or the other of the shoe portions thereof, each of said units being pivotally actuated by braking torque developed from engagement of its axially movable friction elements with spaced apart surfaces of said rotatable drum, each of said struts forming a force transmitting medium between the respective connected units whereby the shoe portion of the unit being actuated is applied by the torque reaction from its axially movable friction elements and the friction elements of the unit connected therewith through said strut.

12. A brake as set forth in claim 11 wherein each of said anchoring devices includes an axial passageway in communication with a source of actuating fluid, a pair of radial passageways intersecting said axial passageway, and said pair of friction units are fitted for rotation on said anchoring device such that one of said units includes a pair of collars positioned around the ends of said cylindrical member and the other of said units includes a collar positioned around the center of said cylindrical member and between said pair of collars, each of said units having a passageway communicating one of said radial passageways with its respective cylindrical friction elements.

References Cited in the file of this patent

UNITED STATES PATENTS

| | | |
|---|---|---|
| 2,057,422 | Dickson | Oct. 13, 1936 |
| 2,344,933 | Lambert | Mar. 21, 1944 |
| 2,372,322 | Goepfrich | Mar. 27, 1945 |

FOREIGN PATENTS

| | | |
|---|---|---|
| 457,483 | Italy | May 20, 1950 |